US007427433B2

(12) United States Patent
Li et al.

(10) Patent No.: US 7,427,433 B2
(45) Date of Patent: Sep. 23, 2008

(54) ONE-WAY VIEWABLE SCREEN

(75) Inventors: Shulong Li, Spartanburg, SC (US); Paul A. McKee, Spartanburg, SC (US)

(73) Assignee: Milliken & Company, Spartanburg, SC (US)

(*) Notice: Subject to any disclaimer, the term of this patent is extended or adjusted under 35 U.S.C. 154(b) by 123 days.

(21) Appl. No.: 10/941,795

(22) Filed: Sep. 15, 2004

(65) Prior Publication Data

US 2006/0057332 A1 Mar. 16, 2006

(51) Int. Cl.
*B32B 3/24* (2006.01)

(52) U.S. Cl. .......................... 428/131; 442/6; 442/132; 442/133

(58) Field of Classification Search ................. 428/131; 442/6, 132, 133
See application file for complete search history.

(56) References Cited

U.S. PATENT DOCUMENTS

| | | | | |
|---|---|---|---|---|
| 4,443,516 | A * | 4/1984 | Rogers | 442/312 |
| 4,673,609 | A | 6/1987 | Hill | 428/187 |
| 5,324,568 | A * | 6/1994 | Coninx et al. | 428/195.1 |
| 5,609,938 | A | 3/1997 | Shields | 428/138 |
| 5,756,153 | A | 5/1998 | Plourde | 427/207.1 |
| 5,830,529 | A | 11/1998 | Ross | 427/152 |
| 5,925,437 | A | 7/1999 | Nelson | 428/137 |
| 6,004,649 | A * | 12/1999 | Nagata | 428/107 |
| 6,030,687 | A | 2/2000 | Andriash | 428/138 |
| RE37,186 | E | 5/2001 | Hill | 428/187 |
| 6,258,429 | B1 | 7/2001 | Nelson | 428/42.1 |
| 6,507,413 | B1 | 1/2003 | Mueller et al. | 358/1.9 |

* cited by examiner

*Primary Examiner*—William P Watkins, III
(74) *Attorney, Agent, or Firm*—Cheryl J. Brickey

(57) ABSTRACT

A screen or fencing structure which provides one-way viewing characteristics under conditions of substantially equal lighting on each side of the structure is described. The structure has a fabric which has a light transmission of about 2.8% to about 25%. The first side of the structure has an overall light reflectance to light transmission ratio of greater or equal to about 2.5, and the opposite side of the structure has an overall light reflectance to light transmission ratio of less than or equal to about 2. Fabrics that can be used to make screens are also described.

4 Claims, 4 Drawing Sheets

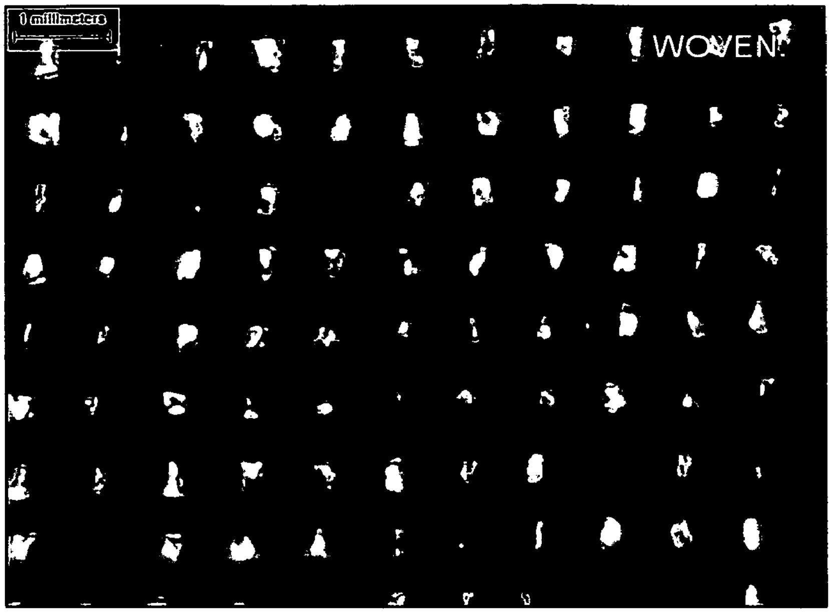
*FIG. –2–*
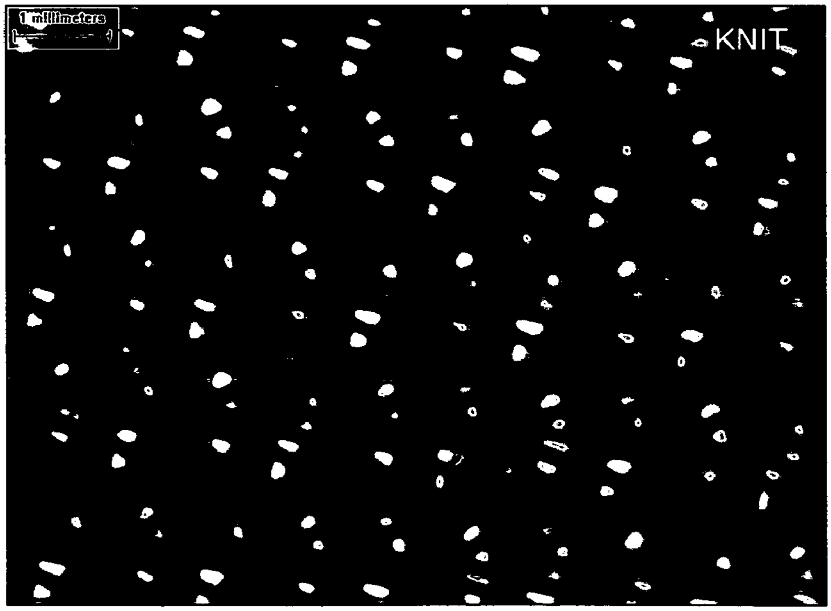
*FIG. –3–*

ONE-WAY VIEWABLE SCREEN

BACKGROUND OF THE INVENTION

Fencing is often utilized in a variety of situations to define property boundaries, or to keep people, animals, and or objects inside or out of a property. Conventional fencing is generally provided in two forms: two-way viewable (where individuals on each side of the fencing can see through it) or non-viewable (where individuals on each side of the fencing cannot see through it, as in the case of privacy fencing.)

Similarly, screen and divider panels are conventionally provided to be non-viewable, to block individuals on either side of the screen from seeing clearly through to the other side. In some circumstances, one-way viewable screens or mirrors have been provided. In particular, one-way mirrors are occasionally provided in some department stores, nurseries, and witness questioning rooms so that the activities taking place inside the room can be observed from others outside that room, without the people in the room being observed being able to see their observers. One way see-through mirrors only work when the light condition on one side is substantially greater than the other. As will be readily appreciated, such one-way glass mirrors are rigid and fragile, rendering them useful only in specific environments such as along a rigid wall.

Other one-way viewable materials such as perforated vinyls, are designed for situations where the lighting conditions on the two sides of the material are quite different. (For example, such materials are typically used on building windows or automobile windows, where the light inside of the structure and adjacent to one side of the material would be dramatically different from that on the outside of the structure, adjacent to the other side of the material.) Those panel materials typically have a see through open area of about 30 to 50% comprising a plurality of relatively large openings (e.g. circular openings about 1 mm in diameter.) However, they do not provide proper one-way see through properties when lighting conditions on both sides are about the same.

Examples of such perforated vinyl, printed film and semi-transparent metallic coatings on glass used to provide one-way see through (from a low light intensity side, and non-see through from high light intensity side) are described in U.S. Pat. Nos. 5,925,437, 6,258,429 and 4,673,609. As noted previously, such materials do not provide one-way viewing when the lighting on both sides of the material is approximately the same.

SUMMARY

The present invention is directed to a fence, screen, divider or the like which provides one-way viewing properties in situations where light conditions on both sides of the structure are approximately the same. (As used herein, such structures will be collectively referred to as “screens”.) As noted previously, prior one-way viewing structures do not enable one-way viewing when the lighting is approximately the same on both sides of the structure. In fact, the present inventors have found that the conventional materials have an optical pathway equivalent to at least about 30-50% light transmission (e.g., 1 mm diameter holes spaced by 1.4 mm were found to be equivalent to about 40% light transmission; 1/16 inch diameter holes spaced by 3/32 inch were found to be equivalent to about 35% light transmission, by calculating the percent open area and assuming transmission occurs only through that open area.) However, it has been found that such high levels of light transmission fail to provide the non-see through property in one direction in equal lighting situations regardless of how reflective the material is. Preferably, the area of the openings in the screen of the invention are smaller than the area of a 1 mm diameter circular opening (i.e. 0.785 $mm^2$. Openings of less than 0.2 $mm^2$ are preferred (the area of a 0.55 mm diameter circle), and openings 0.07 $mm^2$ (the area of a 0.3 mm diameter circle) are even more preferred. However, other sizes and shapes of openings can be used within the scope of the invention.

In addition to the advantage of providing one-way viewing under similar lighting conditions on both structure sides, the invention can also be made to have good air permeability and high mechanical strength, in most cases, without the need for a perforation manufacturing step. Because of these additional properties, it has been found that the material has particular utility in outdoor fencing applications, where high winds may be encountered.

The screens are designed for optimal performance when the light intensity is greater than 20 Lux. As noted, the screens of the invention work well when the light intensity on both sides of the screen is approximately the same. However, the screens also have been found to work well when the light intensity on the reflective side is greater than the light intensity on the highly light absorbing (i.e. less reflective) side. It is to be noted that a range of light transmission values and light reflection to light transmission ratios are described; as will be readily appreciated, the see-through and blocking performance are affected by the light intensity. For example, a greater see through capability is generally achieved when the light intensity is brighter than when it is relatively low.

The screens of the invention desirably have a light transmission of about 2.8 to about 25% in the 400-700 nm spectrum (i.e. the visible spectrum.) The screens also have a first side having an overall light reflectance to light transmission ratio of $\geqq 2.5$, and a second side having an overall light reflectance to light transmission ratio of $\leqq 2$.

BRIEF DESCRIPTION OF THE DRAWINGS

FIG. 2 is a photomicrograph of a woven version of a structure according to the invention;

FIG. 3 is a photomicrograph of a knit version of a structure according to the invention, illustrating an alternative distribution and size of openings;

DETAILED DESCRIPTION

In the following detailed description of the invention, specific preferred embodiments of the invention are described to enable a full and complete understanding of the invention. It will be recognized that it is not intended to limit the invention to the particular preferred embodiment described, and although specific terms are employed in describing the invention, such terms are used in a descriptive sense for the purpose of illustration and not for the purpose of limitation.

Figure 1:
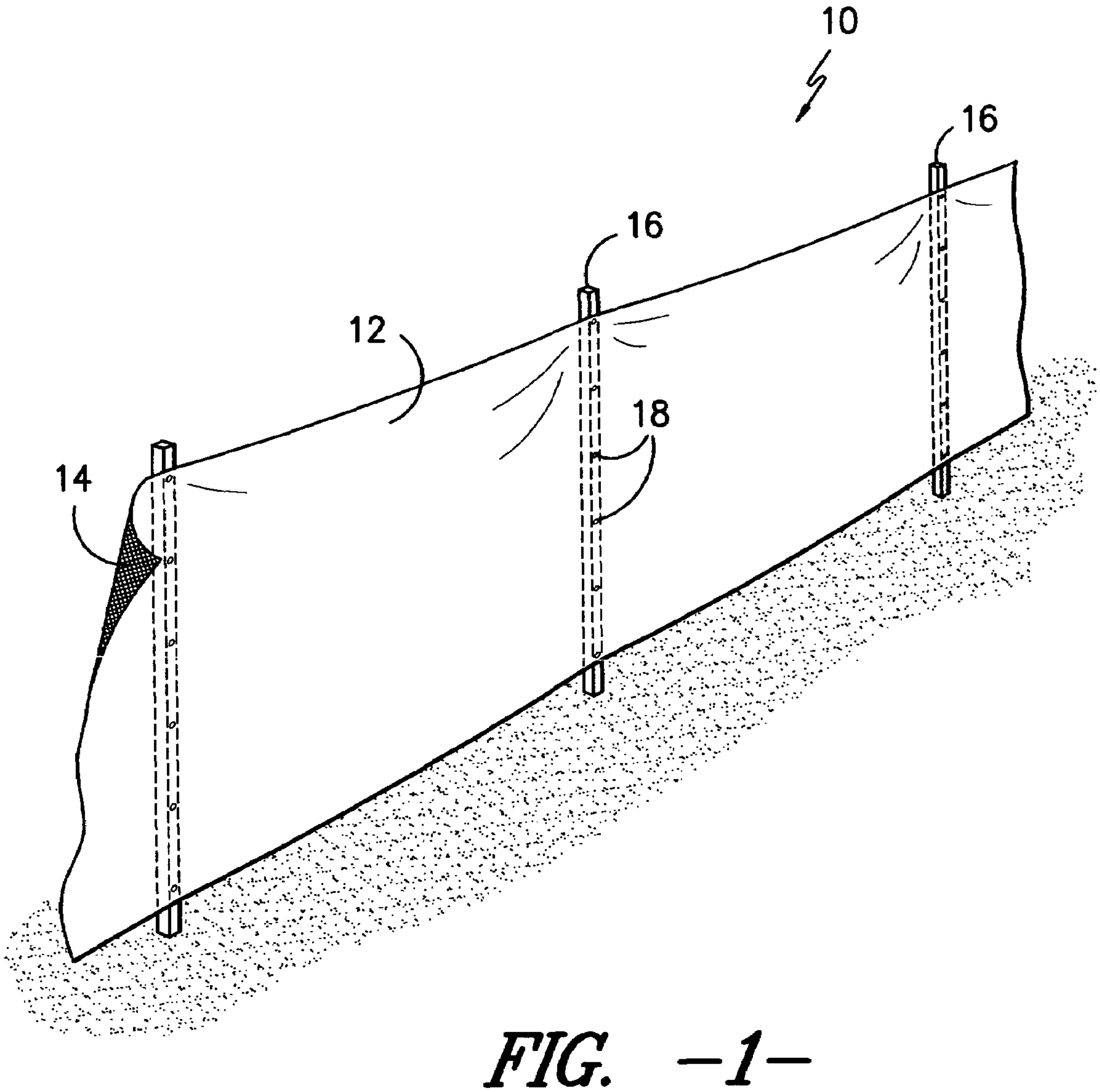
FIG. 1 is a perspective view of a screen according to the invention.

With reference to the drawings, FIG. 1 is a perspective representative of a screen 10 according to the invention, which in this case is in the form of a fence. As illustrated, the fence includes supports 16, to which a material is secured by way of fasteners 18. (As will be readily appreciated by those of ordinary skill in the art, the screen can be constructed in any configuration or manner, with FIG. 1 simply being generally representative of how a material can be oriented such that it is exposed to substantially the same light on each of its two sides.) The screen 10 includes a first side 12 designed to be the non-see-through side, and a second side 14 designed to be the side that can be seen through. When this screen is utilized under conditions of approximately equal lighting on each side, an observer looking at side 12 of the screen would not be able to see through the screen, while an observer looking at side 14 would be able to see through the screen.

Figure 4:
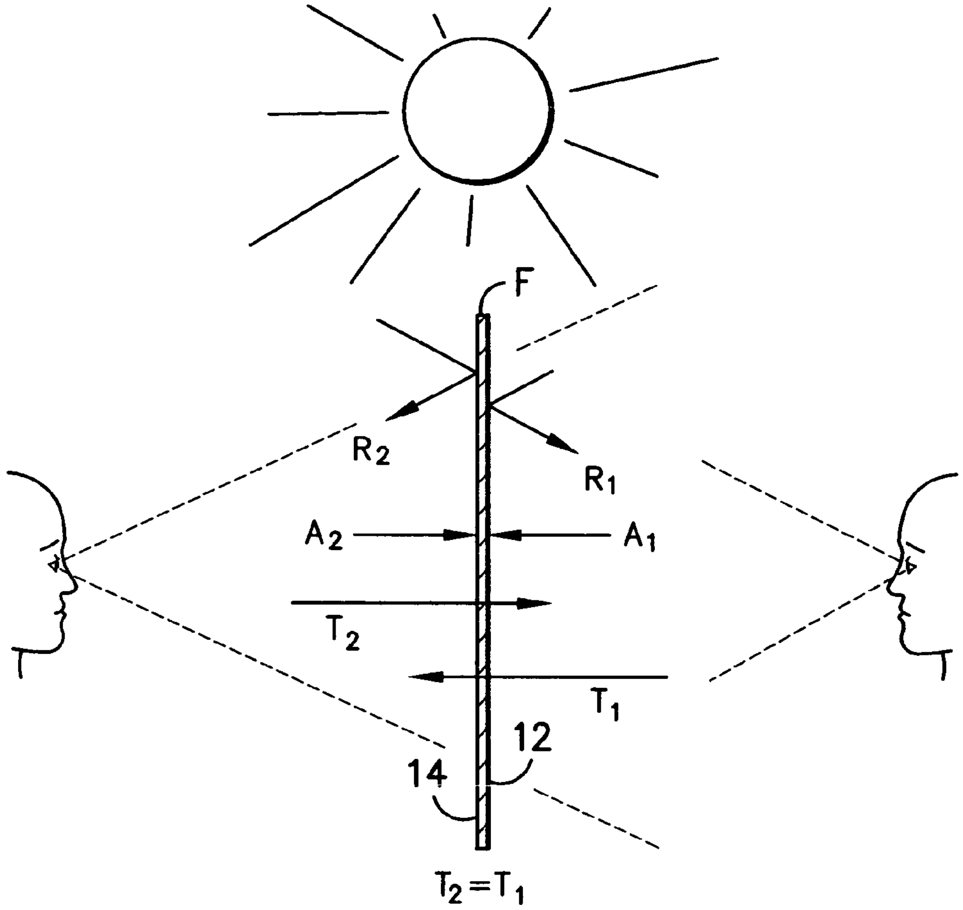
FIG. 4 is a schematic representation of a screen in FIG. 1, illustrating the light transmission, reflectance and absorption.

As will be appreciated by those of ordinary skill in the art, an observer looking at a structure such as a screen can only see things on the opposite side of the screen by virtue of the light that is transmitted through the screen from the opposite side. As shown in FIG. 4, each side of the material F is exposed to substantially the same amount of light; therefore:

$$T1=T2, \text{ and } T2+R2+A2=100\%, \text{ and } T1+R1+A1=100\%, \text{ where}$$

T1=the light transmitted through side 12

R1=the light reflected by side 12;

A1=the light absorbed by side 12;

T2=the light transmitted through side 14;

R2=the light reflected by side 14;

A2=the light absorbed by side 14, since the amount of light is all either transmitted through the screen, reflected back from the screen, or absorbed by the screen.

The inventors have discovered that by engineering the fabric to have a light transmission of about 2.8% to about 25% in the 400-700 nm spectrum, and engineering the first side of the screen to have an overall light reflectance to light transmission ratio of $\geqq 2.5$ and the second side of the screen to have an overall light reflectance to light transmission ration of $\leqq 2$, a screen can be achieved that has good non-see through (i.e. blocking) characteristics on one side, and good see through characteristics on the other side, under conditions where each side is exposed to substantially the same amount of light.

The invention is characterized by a textile structure having a light transmission of about 2.8-about 25% in the 400-700 nm spectrum. (For purposes of this application, light transmission within the visible spectrum is obtained by measuring the light transmission at every 10 nm wavelength from 400-700 nm using a spectrometer in a conventional manner, with light transmission and reflection being measured as a percentage of an incident light beam.) Even more preferably, the structure has a light transmission of about 15% or less in the 400-700 nm spectrum. In addition, the textile has two sides with substantially different optical properties, where one side of the textile has an overall light reflectance to light transmission ratio of at least 2.5, and preferably about 5 or greater, and more preferably about 10 or greater, and the other side of the textile has the ratio of about 2 or less, and more preferably about 1.5 or less. It is also highly preferred that the side with high reflectance have minimal light absorption while the other side has the maximum light absorption possible. (As noted previously, the total light is the sum of the light transmitted through the fabric plus the light reflected back by the fabric and the amount of light absorbed by the fabric. Therefore it follows that to maximize reflection, one would seek to minimize absorption.)

In addition to having a light transmission of about 2.8-25%, the size of openings in the material is also desirably small (as noted previously), with the openings being relatively uniformly distributed across the whole material. It has found that this combination provides particularly good see-through properties. When larger sized holes are used in combination with the above-described low level of overall opening, fewer holes are needed and the holes would be separated farther apart. As a result, it was discovered that an observer would not be able to piece together the whole picture on the other side of the material from limited partial light transmission regardless of other optical properties the material may have. The size of opening therefore for this invention is preferably 0.7 $mm^2$ or less, and more preferably 0.07 $mm^2$ or less, and the openings are desirably substantially uniformly distributed across dimension of the material designed to be see-through. In most cases, it would be desirable to have the entire dimension of the structure be see through, in which case the openings would be distributed across the entire dimension of the material. However, in another of the invention; see-through portions of material could be provided adjacent areas that are not see through. For example, a grid structure formed of regions without openings could be formed to provide additional strength to the material, provide a particular design, or the like.

The overall light transmission of about 2.8-25% through the textile structure is preferably achieved by controlling the yarn density such that the openings between yarn interstices of the fabric structure provide the desired level of light transmission. The textile can be of any variety, including woven, knit, or nonwoven. In a preferred form of the invention designed to perform well in environments where high strength is desired, a warp knit structure is preferred. Alternatively, perforation, coating and printing can also be used to generate optical pathways or partially block optical pathways to control the level of light transmission. However, because perforation generates waste material, and can significantly reduce the strength of the material, it would generally not be preferred for applications where high mechanical strength is required (e.g. for fence and barrier materials.)

Light reflection can be achieved using one or more of the following: a white fiber/fabric surface; a coating on the fabric containing reflective materials such as titanium dioxide, zinc oxide, zirconium oxide, barium sulfate, calcium carbonate, magnesium carbonate, calcium phosphate, mica, metal pigments such as baluminum and brass; a metallic coating, such as sputtering or thermal vapor deposition of aluminum on a textile structure, or electroless plating of silver, chromium or similar reflective metals. Fibers with trilobal cross-sections or ribbon like fibers can also be used to provide high reflection.

Optical brighteners, other types of luminescent dyes and pigments can also be incorporated on the highly reflective side of the fabric to provide improved reflectance. Those materials can absorb UV light energy and emit the energy as visible light, and thus provide improved brightness to a human's eyes.

Low reflectance is achieved by dark color fabric surface, either by dyeing, printing or coating with materials having high light absorption property. High light absorption can be achieved by using one or more of: dark color dyes, and/or pigments such as carbon black, iron oxide, and graphite.

In one embodiment, the inventive textile structure is provided by forming a textile structure using a warp knitting process, dyeing the fabric to a dark black color, and coating one side of the fabric with a reflective coating such as a mixture of polyacrylic resin and titanium dioxide pigment. The warp knit process provides sufficient yarn density such that the light transmission through the structure is 25% or less, the coating provides high overall reflectance on one fabric side, and the black dye provides the high light absorption on the opposite surface. Alternatively, the fabric could be formed from previously-dyed or solution dyed fibers, or be coated with a coating without being first dyed.

In another embodiment, a white or other light colored fabric is stitched, laminated, or otherwise secured to a dark-colored highly light absorbent fabric to form a two layer composite, such that the overall composite has a light transmission of 25% or less in the visible wavelength range, and reflectance to transmission ratio of at least 2.5 on the white fabric side and a ratio of about 2 or less on the dark colored fabric side. Fabric construction techniques can utilized to form such textile structure with minimal or no further processing. For example, a reflective white or light colored yarn and a dark colored highly light absorbent yarn, for example, can be woven or knit into a fabric such that the light colored/white yarn is disposed predominantly on one side, while the dark colored yarn is disposed predominantly on the other side. The fabric would desirably be formed with a yarn density such that the overall light transmission through the finished fabric is less than about 25%. Alternatively, satin weave, dobby weave, jacquard weave, plain weave, basket weave, or the like can be used to weave a single layer or double layer fabric wherein a light colored yarn is predominantly disposed on one side of fabric and a highly light absorbing dark colored yarn is predominantly disposed on the other side. For example, a white trilobal yarn can be used as a warp yarn and a solution dyed dark black yarn can be used as a filling yarn in a satin weave such that the white warp yarn is predominantly disposed on one side and the dark black yarn on the other. As a further alternative, a knit fabric with a highly reflective side and a highly light absorbing side can also be formed by using warp knit, and double needle bar knitting. A double layer fabric is preferred when weaving or knitting technique is used to dispose reflective yarn on one side and light absorbing yarn on the other.

Figure 5:
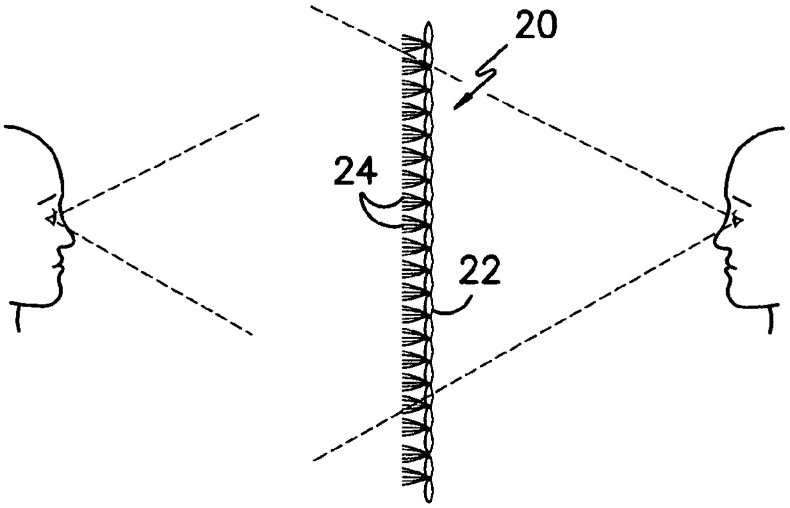
FIG. 5 is a cross-sectional view of an alternative embodiment of the invention.

In yet another example which is illustrated in FIG. 5, a pile fabric is formed, where the pile yarn is a reflective light colored yarn, and the base yarn on the other side of the fabric is dark colored with high light absorbing property. As shown in FIG. 5, the fabric, shown generally at 20, includes a ground yarn structure 22, and a pile formed from a plurality of fiber tufts 24. The pile texture on one side thus provide high overall light reflective feature, while the base of the fabric would have openings (between the yarns in the ground structure and the tufts) to facilitate see through the side of the fabric adjacent the ground yarn structure. The "cone" type of cross section (with the "cones" being formed between adjacent pile tufts) of such fabric structure is desirable for enhancing one way see through. In addition, light absorbing coatings or the like could be provided on the ground yarn 22 and the portion of tuft yarn in contact with the ground yarn.

Figure 6:
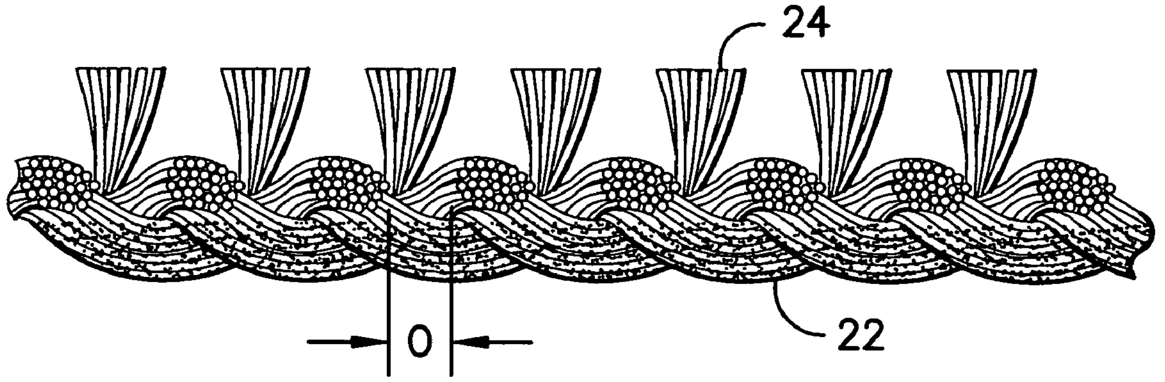
FIG. 6 is a cross-sectional view of a tufted version of a fabric of the invention.
Figure 7:
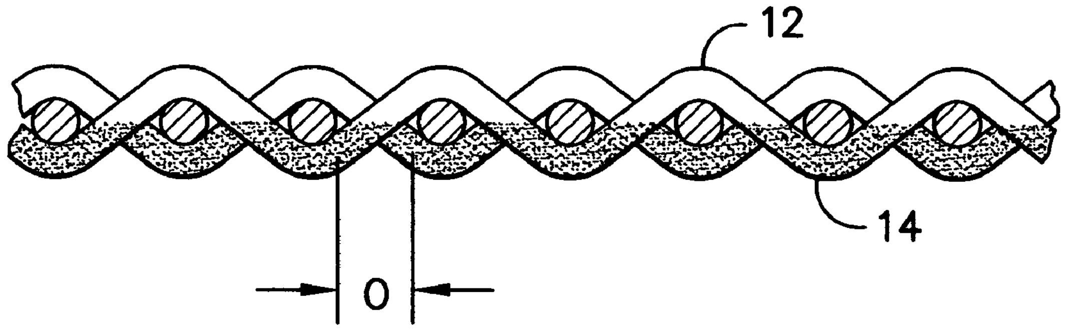
FIG. 7 is a cross-sectional view of a woven fabric according to the invention.

FIG. 6 illustrates the fabric shown in FIG. 5, with an opening O depicted, which would be present between the yarns forming the fabric. Similarly, FIG. 7 illustrates a woven fabric, with an opening O illustrated as it would appear between the adjacent yarns forming the fabric, and showing the different sides 12, 14 (as shown in FIGS. 1 and 4.)

In yet another embodiment, a pattern of print and/or texture is further provided on top of the highly reflective side. Such texture or print on a reflective surface would attract an observer to visually focus on the plane of such surface and omit the light transmit through the fabric. Such pattern can significantly improve the non-see through property on the highly reflective side. Such pattern can be provided by printing, fabric construction, embossing, etching or the like. Photoluminescent or similar bright color print would be suitable for this purpose. Dark color print on highly reflective side, on the other hand, would diminish the reflectance and would not be desirable. Screening printing, ink jet printing, air brush, flexographic printing, electrostatic printing, and laser printing can be used to provide a printed pattern. Texture pattern can by formed by jacquard weaving, double needle bar knitting, dobby weaving, patterned sanding, laser etching, embossing and similar methods.

Light transmission and reflectance of such textile structure can be measured using a light spectrometer, such as a Jasco V-570 spectrometer available from Jasco, Inc. of Easton, Md., using an incident light of visible wavelength from 400 nm to 700 nm.

Other features such as infrared signature, infrared absorption, reflection, and infrared fluorescence can also be incorporated to one or both side of the fabric by using infrared reflective pigment, carbon black or infrared absorbing/fluorescence dyes. In addition, designs can be printed, embossed, painted, or otherwise provided on one or both of the fabric surfaces as desired, provided the pattern does not interfere to an extent that the respective reflectance, transmission and absorbance cannot be achieved.

EXAMPLE

Example 1

A plain warp knit fabric having 24 courses by 28 wales per inch was formed by using 3 bars of 1/150/24 56T (meaning a 1 ply, 150 denier yarn with 24 filaments per yarn of Dacron type 56 round cross-section polyester yarn) yarns and one bar of 1/100/34 56T background yarn. The fabric had a weight of about 8.88 ounces per square yard. The intersticial openings of the fabric varied mostly in the range of 0.1-0.25 mm, and they are spaced from each other by about 0.3-2 mm as shown in FIG. 3. The fabric was then jet dyed in a conventional manner to a dark black color using black disperse dye such that a low reflectance (approximately 4%) in the visible spectrum is achieved. The fabric was then heat set in a conventional manner on a tenter frame. An aluminum reflective pigment-containing metallic finish spray paint manufactured by Rust-Oleum Corporation was used to spray paint one side of the fabric such that the side was covered with metallic paint. The coated fabric has an air permeability of about 135 cfm at 125 Pa pressure using ASTM D737-96. The fabric was fixed vertically in both indoor and outdoor locations such that both sides of the fabric were under similar illumination conditions. Observation was made from 10 to 20 feet away from the fabric from both sides to determine the one-way see through property. The fabric provided good see-through property from the uncoated black side, but substantially non-see through property from the coated side when both side of the fabric was under equal lighting conditions either indoor or outdoor.

Example 2

The same warp knit fabric as used in Example 1 was instead dyed with off-white cream color using disperse dyes. The fabric was then heat set in a conventional manner on a tenter frame. One side of the fabric was then spray painted with metallic reflective coating using metallic finish spray paint manufactured by Rust-Oleum Corporation (of the same variety used in Ex. 1), while the other side of the fabric was coated with a dark black semi-flat spray paint of the variety manufactured sold under the tradename Krylon by Sherwin-Williams, inc. The coated fabric exhibited substantial non-see through from the metallic coating side and good see-through from the black coating side under equal light condition on both side of the fabric both indoor and outdoors when tested in the same manner as described in respect to Example 1.

Example 3

The same off-white cream colored warp knit fabric from Example 2 was used. One side of the fabric was coated with a dark black semi-flat Krylon spray paint. The black coating side provides highly light absorbing and good see through property. Interestingly, no reflective treatment is needed on the other side where off-white fabric surface is reflective enough to provide non-see through property.

Example 4

A woven fabric was formed using a single 574 denier polyester monofilament warp yarn and 535 denier single monofilament Nylon 6 filing yarn. The fabric is woven in a plain weave pattern with 34 picks per inch and 35 ends per inch. A black coating was applied by using semi-flat Krylon black spray paint on one side. The other side is coating with a 1:1 ratio mixture of Mearlite Ultra bright UWA (manufactured by Engelhard Corporation) and a polyurethane latex, Impranil 85UD (by Bayer Corp, leverkusen, Germany). Mearlite Ultra Bright UWA is a water dispersion of titanium dioxide coated mica reflective pigment. It was found that this fabric did not have good non-see through properties from the reflective side, which it is believed by the inventors was due to the high level of openness. Due to the relative high openness of the fabric structure, the resulting fabric does not have good non-see through property from the highly reflective side of the fabric although significantly less clear see through was observed from the reflective side. This can also be understood from the low 2.37 ratio of reflection to transmission on the reflective side.

Example 5

A black activated carbon woven fabric, FM1/250 (manufactured by Activated Charcoal International, in United Kingdom), was coated with a metallic finish spray paint manufactured by Rust-Oleum Corporation on one side only. The black activated carbon fiber provided highly light absorbing property on the other side. The interstitices between warp and filing yarns provide the light transmission property. The coated fabric has good one way see through property in both indoor and outdoor lighting condition. The interstitial opening of the fabric had openings of about 0.2-0.35 mm (across the dimension of the rectangular holes), and are spaced about 0.8-1 mm apart.

Example 6

A woven spun polyester fabric having 204 denier spun warp yarn and 12 denier spun filing yarn, with a plain weave pattern at 55 picks per inch and 68 ends per inch was dyed dark black using black disperse dye. One side of the fabric is then coated with metallic finish spray paint manufactured by Rust-Oleum Corporation. The fabric exhibited see through property only under outdoor high intensity lighting conditions. The spun yarn texture and too low level of light transmission made the fabric not suitable for one-way see through uses under low light intensity.

Light transmission and reflection measurement is made using a Jasco V-570 visible/UV/NIR spectrometer. Only visible light transmission and reflection are made. The results are listed in the following tables. It was found that the Examples which exhibited a light transmission of about 2.8% and about 25%, and a first side having an overall light reflectance to light transmission ration of ≧2.5, and a second side having an overall light reflectance to light transmission of ≦2 performed well at enabling see through from only one fabric side when the both fabric sides were exposed to the same light conditions. Example #4 illustrates an upper limit of light transmission for non-see through from the reflective side, and Example #6 illustrates a lower limit of light transmission needed for see through from the light absorbing side.

Example 1

Results

| Wavelength nm | Transmission, % | Reflection on side A, % | Reflection on side B, % | Ratio - A side | Ratio - B side |
|---|---|---|---|---|---|
| 700 | 3.881 | 31.692 | 9.772 | 8.165936614 | 2.517907756 |
| 690 | 3.695 | 32.161 | 8.144 | 8.703924222 | 2.20405954 |
| 680 | 3.454 | 31.774 | 6.622 | 9.199189346 | 1.917197452 |
| 670 | 3.242 | 31.35 | 5.396 | 9.669956817 | 1.664404688 |
| 660 | 3.122 | 31.241 | 4.663 | 10.00672646 | 1.49359385 |
| 650 | 3.043 | 31.167 | 4.226 | 10.2421952 | 1.388761091 |
| 640 | 3.002 | 31.147 | 4.003 | 10.37541639 | 1.33344437 |
| 630 | 2.987 | 31.159 | 3.916 | 10.43153666 | 1.311014396 |
| 620 | 2.982 | 31.19 | 3.906 | 10.45942321 | 1.309859155 |
| 610 | 2.984 | 31.231 | 3.926 | 10.46615282 | 1.315683646 |
| 600 | 2.983 | 31.264 | 3.94 | 10.4807241 | 1.320817968 |
| 590 | 2.984 | 31.3 | 3.961 | 10.48927614 | 1.327412869 |
| 580 | 2.986 | 31.329 | 3.992 | 10.49196249 | 1.336905559 |
| 570 | 2.983 | 31.358 | 3.997 | 10.512236 | 1.339926249 |
| 560 | 2.977 | 31.371 | 3.969 | 10.53778972 | 1.333221364 |
| 550 | 2.973 | 31.391 | 3.962 | 10.55869492 | 1.332660612 |
| 540 | 2.972 | 31.408 | 3.97 | 10.5679677 | 1.335800808 |
| 530 | 2.967 | 31.422 | 3.951 | 10.59049545 | 1.331648129 |
| 520 | 2.954 | 31.404 | 3.917 | 10.6310088 | 1.325998646 |
| 510 | 2.952 | 31.429 | 3.926 | 10.64668022 | 1.329945799 |
| 500 | 2.951 | 31.459 | 3.949 | 10.66045408 | 1.338190444 |
| 490 | 2.946 | 31.477 | 3.953 | 10.68465716 | 1.341819416 |
| 480 | 2.938 | 31.495 | 3.956 | 10.71987747 | 1.346494214 |

-continued

| Wavelength nm | Transmission, % | Reflection on side A, % | Reflection on side B, % | Ratio - A side | Ratio - B side |
|---|---|---|---|---|---|
| 470 | 2.94 | 31.556 | 3.974 | 10.73333333 | 1.35170068 |
| 460 | 2.956 | 31.747 | 4.002 | 10.73985115 | 1.353856563 |
| 450 | 2.967 | 31.905 | 4.032 | 10.75328615 | 1.358948433 |
| 440 | 2.949 | 31.785 | 4.025 | 10.77822991 | 1.364869447 |
| 430 | 2.924 | 31.684 | 3.998 | 10.83584131 | 1.367305062 |
| 420 | 2.921 | 31.761 | 4.04 | 10.87333105 | 1.383087984 |
| 410 | 2.913 | 31.714 | 4.112 | 10.88705802 | 1.411603158 |
| 400 | 2.919 | 31.797 | 4.25 | 10.89311408 | 1.455978075 |
| Average | 3.046677419 | 31.48929032 | 4.466129032 | 10.3802041 | 1.446584433 |

Example 2

Results

| Wavelength nm | Transmission, % | Reflection on side A, % | Reflection on side B, % | Ratio - A | Ratio - B |
|---|---|---|---|---|---|
| 700 | 3.021 | 32.772 | 3.579 | 10.84806356 | 1.184707051 |
| 690 | 3.108 | 33.54 | 3.666 | 10.79150579 | 1.17953668 |
| 680 | 3.1 | 33.656 | 3.636 | 10.85677419 | 1.172903226 |
| 670 | 3.066 | 33.576 | 3.592 | 10.95107632 | 1.171559035 |
| 660 | 3.061 | 33.66 | 3.591 | 10.9964064 | 1.173146031 |
| 650 | 3.053 | 33.747 | 3.59 | 11.05371765 | 1.175892565 |
| 640 | 3.046 | 33.826 | 3.591 | 11.10505581 | 1.178923178 |
| 630 | 3.04 | 33.905 | 3.591 | 11.15296053 | 1.18125 |
| 620 | 3.037 | 33.981 | 3.592 | 11.1890023 | 1.182746131 |
| 610 | 3.032 | 34.053 | 3.593 | 11.23120053 | 1.185026385 |
| 600 | 3.027 | 34.126 | 3.595 | 11.27386852 | 1.187644533 |
| 590 | 3.02 | 34.183 | 3.598 | 11.31887417 | 1.191390728 |
| 580 | 3.015 | 34.243 | 3.6 | 11.35754561 | 1.194029851 |
| 570 | 3.01 | 34.287 | 3.601 | 11.3910299 | 1.196345515 |
| 560 | 3.002 | 34.335 | 3.606 | 11.43737508 | 1.201199201 |
| 550 | 2.996 | 34.384 | 3.61 | 11.47663551 | 1.20493992 |
| 540 | 2.992 | 34.432 | 3.614 | 11.50802139 | 1.207887701 |
| 530 | 2.987 | 34.473 | 3.619 | 11.54101105 | 1.211583529 |
| 520 | 2.974 | 34.485 | 3.624 | 11.59549428 | 1.218560861 |
| 510 | 2.971 | 34.529 | 3.633 | 11.62201279 | 1.222820599 |
| 500 | 2.962 | 34.571 | 3.643 | 11.67150574 | 1.229912221 |
| 490 | 2.955 | 34.593 | 3.655 | 11.70659898 | 1.236886633 |
| 480 | 2.946 | 34.612 | 3.667 | 11.74881195 | 1.244738629 |
| 470 | 2.941 | 34.652 | 3.687 | 11.78238694 | 1.253655219 |
| 460 | 2.951 | 34.857 | 3.722 | 11.81192816 | 1.261267367 |
| 450 | 2.965 | 35.115 | 3.747 | 11.84317032 | 1.263743676 |
| 440 | 2.945 | 35.117 | 3.742 | 11.92427844 | 1.270628183 |
| 430 | 2.92 | 35.01 | 3.749 | 11.98972603 | 1.28390411 |
| 420 | 2.915 | 35.106 | 3.777 | 12.0432247 | 1.295711835 |
| 410 | 2.896 | 35.119 | 3.78 | 12.12672652 | 1.305248619 |
| 400 | 2.881 | 35.15 | 3.809 | 12.20062478 | 1.322110378 |
| Average | 2.994677419 | 34.32564516 | 3.648354839 | 11.46924561 | 1.219029019 |

Example 3

Results

| Wavelength nm | Transmission, % | Reflection on side A, % | Reflection on side B, % | Ratio - A | Ratio - B |
|---|---|---|---|---|---|
| 700 | 4.642 | 42.569 | 3.574 | 9.170400689 | 0.769926756 |
| 690 | 4.715 | 43.54 | 3.649 | 9.234358431 | 0.773913043 |
| 680 | 4.681 | 43.756 | 3.606 | 9.347575304 | 0.770348216 |

-continued

| Wavelength nm | Transmission, % | Reflection on side A, % | Reflection on side B, % | Ratio - A | Ratio - B |
|---|---|---|---|---|---|
| 670 | 4.623 | 43.592 | 3.568 | 9.429374865 | 0.771793208 |
| 660 | 4.605 | 43.679 | 3.564 | 9.485124864 | 0.773941368 |
| 650 | 4.586 | 43.769 | 3.557 | 9.5440471 | 0.775621457 |
| 640 | 4.568 | 43.855 | 3.553 | 9.600481611 | 0.777802102 |
| 630 | 4.55 | 43.945 | 3.549 | 9.658241758 | 0.78 |
| 620 | 4.531 | 44.044 | 3.547 | 9.720591481 | 0.782829397 |
| 610 | 4.512 | 44.138 | 3.543 | 9.782358156 | 0.785239362 |
| 600 | 4.491 | 44.265 | 3.541 | 9.856379426 | 0.788465821 |
| 590 | 4.475 | 44.387 | 3.539 | 9.918882682 | 0.790837989 |
| 580 | 4.456 | 44.47 | 3.538 | 9.979802513 | 0.793985637 |
| 570 | 4.432 | 44.492 | 3.535 | 10.03880866 | 0.797608303 |
| 560 | 4.404 | 44.512 | 3.532 | 10.1071753 | 0.801998183 |
| 550 | 4.386 | 44.596 | 3.532 | 10.16780666 | 0.805289558 |
| 540 | 4.364 | 44.723 | 3.534 | 10.24816682 | 0.809807516 |
| 530 | 4.342 | 44.823 | 3.536 | 10.32312298 | 0.814371257 |
| 520 | 4.314 | 44.87 | 3.536 | 10.40101994 | 0.819656931 |
| 510 | 4.289 | 45.017 | 3.54 | 10.49591979 | 0.825367218 |
| 500 | 4.267 | 45.149 | 3.546 | 10.58097024 | 0.831028826 |
| 490 | 4.239 | 45.193 | 3.553 | 10.66124086 | 0.83816938 |
| 480 | 4.209 | 45.207 | 3.561 | 10.74055595 | 0.846044191 |
| 470 | 4.182 | 45.276 | 3.577 | 10.82639885 | 0.855332377 |
| 460 | 4.17 | 45.594 | 3.608 | 10.93381295 | 0.865227818 |
| 450 | 4.159 | 46.009 | 3.629 | 11.06251503 | 0.872565521 |
| 440 | 4.115 | 46.07 | 3.616 | 11.19562576 | 0.87873633 |
| 430 | 4.062 | 45.956 | 3.62 | 11.3136386 | 0.891186608 |
| 420 | 4.034 | 46.051 | 3.642 | 11.41571641 | 0.902825979 |
| 410 | 3.967 | 45.844 | 3.64 | 11.5563398 | 0.917569952 |
| 400 | 3.909 | 45.411 | 3.655 | 11.61703761 | 0.935021745 |
| Average | 4.36383871 | 44.67103226 | 3.571612903 | 10.27140294 | 0.820726195 |

Example 4

Results

| Wavelength nm | Transmission, % | Reflection on side A, % | Reflection on side B, % | Ratio - A | Ratio - B |
|---|---|---|---|---|---|
| 700 | 27.302 | 65.82 | 16.763 | 2.410812395 | 0.613984323 |
| 690 | 26.998 | 65.826 | 16.559 | 2.438180606 | 0.613341729 |
| 680 | 26.893 | 65.706 | 16.359 | 2.443238017 | 0.608299558 |
| 670 | 26.836 | 65.349 | 16.046 | 2.43512446 | 0.597928156 |
| 660 | 26.76 | 65.081 | 15.766 | 2.432025411 | 0.58916293 |
| 650 | 26.651 | 64.791 | 15.462 | 2.431090766 | 0.580165847 |
| 640 | 26.52 | 64.494 | 15.09 | 2.431900452 | 0.569004525 |
| 630 | 26.399 | 64.133 | 14.639 | 2.429372325 | 0.554528581 |
| 620 | 26.268 | 63.727 | 14.087 | 2.426031674 | 0.536279884 |
| 610 | 26.113 | 63.34 | 13.524 | 2.425611764 | 0.51790296 |
| 600 | 25.994 | 62.939 | 13.077 | 2.421289528 | 0.503077633 |
| 590 | 25.914 | 62.617 | 12.827 | 2.416338659 | 0.494983407 |
| 580 | 25.887 | 62.286 | 12.697 | 2.406072546 | 0.490477846 |
| 570 | 25.838 | 61.926 | 12.563 | 2.396702531 | 0.486221844 |
| 560 | 25.787 | 61 .556 | 12.423 | 2.387094272 | 0.481754372 |
| 550 | 25.726 | 61.258 | 12.336 | 2.3811708 | 0.479514888 |
| 540 | 25.681 | 60.981 | 12.304 | 2.374557066 | 0.479109069 |
| 530 | 25.666 | 60.735 | 12.338 | 2.366360165 | 0.480713785 |
| 520 | 25.626 | 60.464 | 12.365 | 2.359478654 | 0.489517755 |
| 510 | 25.6 | 60.23 | 12.365 | 2.352734375 | 0.483007813 |
| 500 | 25.558 | 59.927 | 12.311 | 2.344745285 | 0.481688708 |
| 490 | 25.515 | 59.627 | 12.203 | 2.336939055 | 0.478267686 |
| 480 | 25.473 | 59.35 | 12.078 | 2.329917952 | 0.474149099 |
| 470 | 25.403 | 59.058 | 11.958 | 2.324843522 | 0.470731803 |
| 460 | 25.251 | 58.787 | 11.865 | 2.328105818 | 0.469882381 |
| 450 | 25.079 | 58.416 | 11.791 | 2.329279477 | 0.470154312 |
| 440 | 25.037 | 57.878 | 11.675 | 2.311698686 | 0.466309861 |
| 430 | 25.035 | 57.385 | 11.603 | 2.292190933 | 0.46347114 |
| 420 | 24.994 | 56.855 | 11.513 | 2.274745939 | 0.460630551 |
| 410 | 24.903 | 55.985 | 11.389 | 2.248122716 | 0.457334458 |
| 400 | 24.738 | 54.299 | 11.082 | 2.194963214 | 0.447974776 |
| Average | 25.85306452 | 61.31696774 | 13.19541935 | 2.370346421 | 0.509115216 |

Example 5

Results

| Wavelength nm | Transmission, % | Reflection on side A, % | Reflection on side B, % | Ratio - A | Ratio - B |
|---|---|---|---|---|---|
| 700 | 3.734 | 34.063 | 3.167 | 9.122388859 | 0.848152116 |
| 690 | 3.688 | 34.209 | 3.148 | 9.275759219 | 0.853579176 |
| 680 | 3.67 | 34.423 | 3.164 | 9.379564033 | 0.862125341 |
| 670 | 3.68 | 34.469 | 3.147 | 9.366576087 | 0.855163043 |
| 660 | 3.681 | 34.548 | 3.128 | 9.385493073 | 0.849769084 |
| 650 | 3.687 | 34.617 | 3.117 | 9.388934093 | 0.845402766 |
| 640 | 3.689 | 34.689 | 3.106 | 9.403361345 | 0.841962591 |
| 630 | 3.687 | 34.759 | 3.088 | 9.42744779 | 0.837537293 |
| 620 | 3.697 | 34.811 | 3.07 | 9.416012984 | 0.830403029 |
| 610 | 3.702 | 34.851 | 3.055 | 9.414100486 | 0.825229606 |
| 600 | 3.706 | 34.919 | 3.037 | 9.422288181 | 0.819481921 |
| 590 | 3.71 | 34.967 | 3.032 | 9.425067385 | 0.817250674 |
| 580 | 3.71 | 35.015 | 3.013 | 9.438005391 | 0.81212938 |
| 570 | 3.714 | 35.054 | 3.001 | 9.438341411 | 0.808023694 |
| 560 | 3.716 | 35.065 | 2.985 | 9.436221744 | 0.8032831 |
| 550 | 3.718 | 35.109 | 2.971 | 9.442980097 | 0.79908553 |
| 540 | 3.723 | 35.135 | 2.956 | 9.437281762 | 0.793983347 |
| 530 | 3.723 | 35.161 | 2.941 | 9.444265377 | 0.789954338 |
| 520 | 3.727 | 35.175 | 2.923 | 9.437885699 | 0.784276898 |
| 510 | 3.725 | 35.197 | 2.909 | 9.44885906 | 0.780939597 |
| 500 | 3.731 | 35.213 | 2.894 | 9.437952292 | 0.775663361 |
| 490 | 3.733 | 35.233 | 2.878 | 9.438253415 | 0.770961693 |
| 480 | 3.737 | 35.247 | 2.863 | 9.431897244 | 0.766122558 |
| 470 | 3.736 | 35.255 | 2.85 | 9.436563169 | 0.762847966 |
| 460 | 3.712 | 35.287 | 2.833 | 9.506196121 | 0.763200431 |
| 450 | 3.682 | 35.382 | 2.827 | 9.609451385 | 0.767789245 |
| 440 | 3.691 | 35.429 | 2.83 | 9.598753725 | 0.766729884 |
| 430 | 3.698 | 35.422 | 2.813 | 9.578691184 | 0.760681449 |
| 420 | 3.71 | 35.489 | 2.812 | 9.565768194 | 0.757951482 |
| 410 | 3.698 | 35.538 | 2.809 | 9.610059492 | 0.759599784 |
| 400 | 3.69 | 35.558 | 2.79 | 9.636314363 | 0.756097561 |
| Average | 3.706612903 | 35.00932258 | 2.972806452 | 9.445184989 | 0.802108966 |

Example 6

Results

| Wavelength nm | Transmission, % | Reflection on side A, % | Reflection on side B, % | Ratio - A | Ratio - B |
|---|---|---|---|---|---|
| 700 | 6.178 | 22.784 | 14.835 | 3.687924895 | 2.401262545 |
| 690 | 5.042 | 21.683 | 10.542 | 4.300476002 | 2.090836969 |
| 680 | 4.048 | 20.521 | 7.163 | 5.069416996 | 1.76951581 |
| 670 | 3.313 | 19.535 | 4.984 | 5.896468458 | 1.504376698 |
| 660 | 2.863 | 18.911 | 3.828 | 6.605309116 | 1.337059029 |
| 650 | 2.623 | 18.523 | 3.279 | 7.061761342 | 1.250095311 |
| 640 | 2.507 | 18.355 | 3.027 | 7.321499801 | 1.207419226 |
| 630 | 2.455 | 18.289 | 2.922 | 7.449694501 | 1.190224033 |
| 620 | 2.436 | 18.295 | 2.891 | 7.510262726 | 1.186781609 |
| 610 | 2.432 | 18.329 | 2.894 | 7.536595395 | 1.189967105 |
| 600 | 2.434 | 18.363 | 2.906 | 7.544371405 | 1.193919474 |
| 590 | 2.433 | 18.395 | 2.919 | 7.560624743 | 1.199753391 |
| 580 | 2.445 | 18.439 | 2.945 | 7.541513292 | 1.204498978 |
| 570 | 2.449 | 18.472 | 2.975 | 7.542670478 | 1.214781543 |
| 560 | 2.456 | 18.511 | 2.998 | 7.537052117 | 1.220684039 |
| 550 | 2.465 | 18.542 | 3.024 | 7.522109533 | 1.226774848 |
| 540 | 2.48 | 18.6 | 3.075 | 7.5 | 1.239919355 |
| 530 | 2.511 | 18.671 | 3.157 | 7.435682995 | 1.257268021 |
| 520 | 2.557 | 18.792 | 3.272 | 7.349237388 | 1.27982456 |
| 510 | 2.609 | 18.919 | 3.437 | 7.251437332 | 1.317362974 |
| 500 | 2.685 | 19.093 | 3.65 | 7.110986965 | 1.359404097 |
| 490 | 2.758 | 19.247 | 3.866 | 6.978607687 | 1.401740392 |
| 480 | 2.752 | 19.271 | 3.898 | 7.002543605 | 1.416424419 |

-continued

| Wavelength nm | Transmission, % | Reflection on side A, % | Reflection on side B, % | Ratio - A | Ratio - B |
|---|---|---|---|---|---|
| 470 | 2.653 | 19.119 | 3.668 | 7.206558613 | 1.382585752 |
| 460 | 2.57 | 18.989 | 3.465 | 7.388715953 | 1.348249027 |
| 450 | 2.533 | 18.957 | 3.377 | 7.484011054 | 1.333201737 |
| 440 | 2.501 | 18.904 | 3.332 | 7.558576569 | 1.332267093 |
| 430 | 2.521 | 18.952 | 3.422 | 7.517651726 | 1.357397858 |
| 420 | 2.584 | 19.177 | 3.645 | 7.421439628 | 1.410603715 |
| 410 | 2.686 | 19.373 | 3.957 | 7.212583768 | 1.473194341 |
| 400 | 2.853 | 19.718 | 4.51 | 6.911321416 | 1.580792149 |
| Average | 2.833290323 | 19.08803226 | 4.124612903 | 7.00055179 | 1.383160842 |

As noted previously, it was discovered by the inventors that a screen having a light transmission of about 2.8-about 25% at the 400-700 nm spectrum, and a first side having an overall light reflectance to light transmission ratio of ≧2.5, and a second fabric side having an overall light reflectance to light transmission ratio of ≦2 provided good see-through from one side and good blockage (i.e. non-see through properties) from the opposite side.

This textile structure can be used in a variety of end uses including but not limited to fences, barriers at building and road construction sites, to cordon off accident sites, as a security curtain or wall panel, room divider, or the like.

In the specification there has been set forth a preferred embodiment of the invention, and although specific terms are employed, they are used in a generic and descriptive sense only and not for purpose of limitation, the scope of the invention being defined in the claims.

We claim:

1. A screen having one-way viewing properties when both sides are exposed to approximately the same intensity of light comprising: a knit or woven fabric having light transmission of about 3 to about 15% in the 400-700 nm spectrum and having first and second fabric sides, the first fabric side including a reflective material containing coating and having an overall light reflectance to light transmission ratio of ≧5, and the second fabric side including a dark colored dye or a dark colored pigment and having an overall light reflectance to light transmission ratio of ≦1.5, wherein the fabric includes a plurality of openings, said openings being ≦0.2 $mm^2$ in size, wherein the second fabric side has a light absorption of greater than about 80%.

2. A screen according to claim 1, wherein the first fabric side has a light absorption of about 60% or less.

3. A screen according to claim 1, wherein the plurality of openings in the fabric are ≦0.07 $mm^2$ in size.

4. A screen according to claim 1, wherein the plurality of openings are generally evenly distributed across the fabric.

* * * * *